Patented Apr. 29, 1930 1,756,315

UNITED STATES PATENT OFFICE

WILLIAM P. ter HORST, OF NITRO, WEST VIRGINIA, ASSIGNOR TO THE RUBBER SERVICE LABORATORIES COMPANY, OF AKRON, OHIO, A CORPORATION OF OHIO

RUBBER VULCANIZATION PROCESS

No Drawing.    Application filed November 28, 1927.   Serial No. 236,370.

My invention relates to processes for vulcanizing rubber and similar materials and to the products obtained thereby and is more particularly directed to acceleration of vulcanization by a class of unsymmetrical tri-substituted guanidines.

According to the present invention I have found that unsymmetrical tri-substituted guanidines having the formula

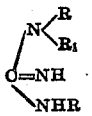

where R is an aryl radical and $R_1$ is an aliphatic radical, constitute a group of valuable accelerators.

One procedure whereby the desired accelerator may be obtained is as follows: Approximately one molecular proportion (118 parts) of phenyl-cyanamide is mixed in a container with approximately one molecular proportion (158 parts) of mono-ethyl-aniline hydrochloride with or without an anhydrous solvent (e. g. toluene).

If a solvent such as anhydrous toluene is used, the ingredients are heated up together at a temperature of approximately 100–110° C. for approximately one to two hours in order to complete the reaction. If no anhydrous solvent such as toluene is used, the ingredients are heated up together at a temperature of approximately 150–170° C. for approximately one to two hours in order to complete the reaction. Sufficient hot water is then added to the reaction product to make an approximate 10% solution of the guanidine hydrochloride, after which any unreacted phenyl cyanamide present is eliminated by extracting with benzene. The reaction product is then run into an approximate 15% solution of sodium hydroxide or other suitable alkali whereupon the crude unsymmetrical tri-substituted guanidine having the formula

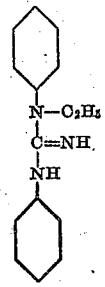

is precipitated, which precipitate is filtered and the filter cake redissolved in hot hydrochloric acid (commercial), adding charcoal to decolorize the solution if necessary. The product is reprecipitated by adding to an approximate 15% caustic soda solution, and purification effected by recrystallization from ethyl alcohol.

In carrying out the invention in its preferred form, a rubber mix comprising 100 parts of rubber, for example pale crepe rubber, 5 parts of zinc oxide and 3.5 parts of sulfur is prepared in the well known manner and to this mix 0.5 parts of one of my new type of accelerators, for example, ethyl phenyl-phenyl guanidine having the formula

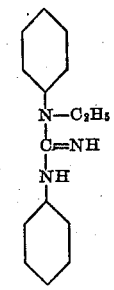

is incorporated therein. The resulting rubber compound is then vulcanized by heating from 45–60 minutes in a press at a temperature given by forty pounds of steam pressure per square inch, whereupon, there results after a period of 60 minutes a vulcanized product, which upon testing is found to possess a modulus at 500% elongation of 480 pounds per square inch, a tensile strength at break of 3315 pounds per square inch and an ultimate elongation of 815%.

In using the expression "as a vulcanizing ingredient" I mean that the unsymmetrical tri-substituted guanidine is a component part of a combination or mixture, which is used to effect vulcanization, and which ordinarily includes sulfur and may and preferably does include zinc oxide and other fillers, pigments and the like.

It is to be understood that this invention is not limited to the specific examples set forth herein for illustrative purposes and that modifications of the invention may be resorted to without departing from the spirit thereof or the scope of the appended claims.

What I claim is:

1. A process of vulcanizing rubber or similar material which comprises combining with the rubber sulfur an unsymmetrical tri-substituted guanidine accelerator having the formula

and vulcanizing the rubber.

2. As a new article of manufacture a vulcanized rubber derived from rubber combined with sulfur and a compound having the formula

In testimony whereof I hereunto affix my signature.

WILLIAM P. ter HORST.